April 19, 1938.   E. J. DILLMAN   2,114,959
CONTROL DEVICE
Filed June 12, 1935

INVENTOR
Earnest J. Dillman
BY
his ATTORNEY

Patented Apr. 19, 1938

2,114,959

UNITED STATES PATENT OFFICE 2,114,959

CONTROL DEVICE

Earnest J. Dillman, Detroit, Mich., assignor to Detroit Lubricator Company, Detroit, Mich., a corporation of Michigan Application June 12, 1935, Serial No. 26,120

7 Claims. (Cl. 200—38)

My invention relates generally to control devices and more particularly to time controlled switch devices.

One of the objects of my invention is to provide a time controlled switch device having new and improved manual setting means which facilitates the setting of the device.

Another object of my invention is to provide a manually set, time controlled switch device suitable for use in connection with a heating system and to provide a device of this character which can be set without the necessity of making mental computations when so doing.

The invention consists in the improved construction and combination of parts to be more fully described hereinafter and the novelty of which will be particularly pointed out and distinctly claimed.

In the accompanying drawing, to be taken as a part of this specification, I have fully and clearly illustrated my invention, in which drawing—

Figure 1:
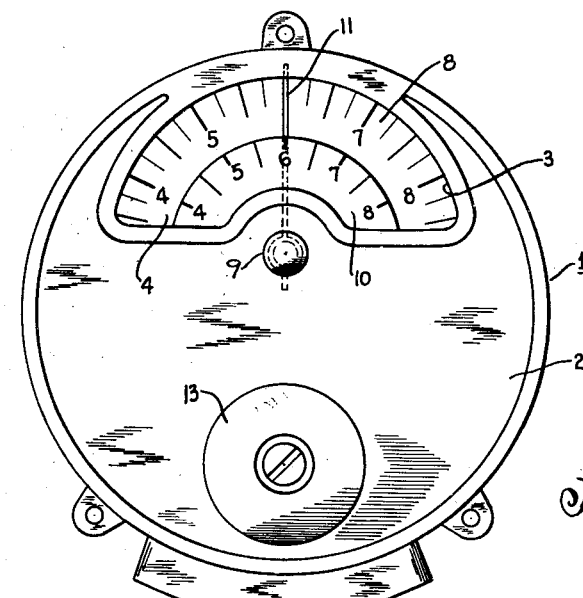
Figure 1 is a view shown in elevation of my time controlled device as seen looking at the face of the device.
Figure 2:
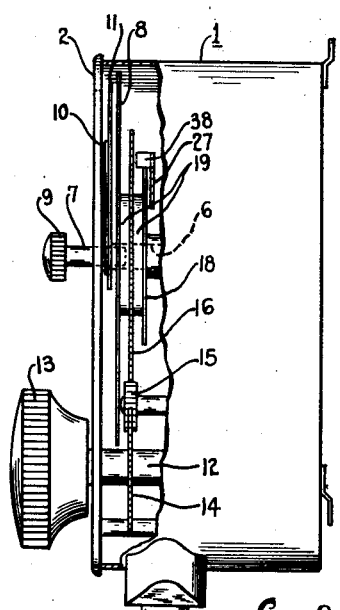
Fig. 2 is a side view of the control device looking from the right to left of Fig. 1 and with the casing partly broken away to show some of the operating parts thereof.

Referring to the drawing by characters of reference, the numeral 1 designates the casing of the device and which, in the present instance, is a hollow, shell-like casing of cylindrical shape, one end of which is closed by a removable closure member 2 which may be a circular-shaped plate and may be secured to the casing by screws or other suitable attaching means. The outer wall of the closure member 2 constitutes the face of the device and the closure member has an opening 3 therethrough which is preferably substantially semi-circular in shape. Preferably the semi-circular shaped opening 3 is eccentrically located with respect to the center of the circular-shaped closure member 2 and with its center of radius in the same vertical plane, as seen on the drawing. The semi-circular opening 3 is also preferably located adjacent the top of the device, as seen on the drawing. A screen 4 is provided for closing the opening 3 and may consist of any suitable transparent material, such as glass, and may be fixed behind the opening 3 in any suitable manner.

Figure 3:
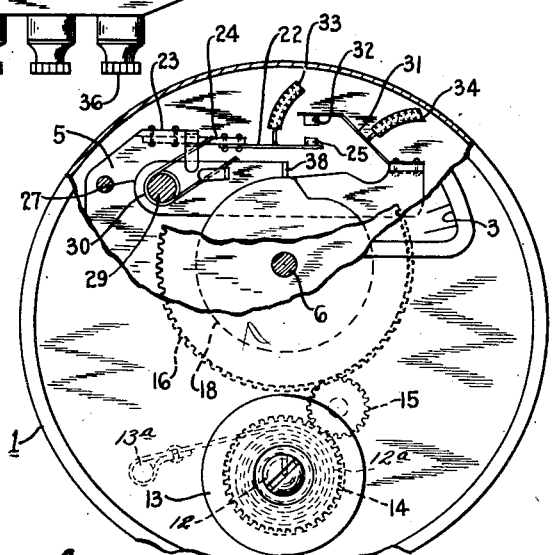
Fig. 3 is a view similar to Fig. 1 with the casing partly broken away to show some of the operating parts thereof.

In the casing 1 there is housed a motor which may be of any suitable type of clock mechanism and which is mounted on a supporting means including a plate member 5, Fig. 3. A stub shaft 6 is fixedly secured to the plate 5 and extends therefrom toward the closure member 2 and preferably with its axis in alignment with the center of the radius of the semi-circular shaped opening 3. In the end of the shaft 6, adjacent the closure member 2, there is provided an axially extending, bored recess for receiving another shaft 7, of smaller diameter, which is journaled in shaft 6 for rotation relative thereto. The shaft 7 projects exteriorly of the casing through an aperture provided in the closure member 2, and on the outer end of the shaft 7 there may be formed an enlarged portion 9 in the form of a knob for manually rotating the shaft 7.

A dial plate 8 is disposed within the casing 1 and is mounted for rotation on the shaft 6. The dial plate 8 is disposed behind the semi-circular opening 3 and may be circular in shape and is preferably of larger area than the opening 3 so as to shield the mechanism in the casing from view through the opening 3. The dial plate 8 is also preferably spaced from, but located adjacent to, the inner wall of the closure member 2 and extends substantially parallel therewith. On the face of the dial plate 8 there is preferably provided indicia for aiding in setting the device, and the indicia may consist of a plurality of spaced, radially extending lines, or like marks, placed thereon so as to be clearly visible through the casing opening 3. The indicia may also include characters, such as numerals, which may be located at every fourth line to represent the hour, with the lines therebetween representing one quarter fractions of the hour.

A second and fixed dial plate 10 is disposed within the casing 1 and is located between the dial plate 8 and the closure member 2. The dial plate 10 is preferably located adjacent the transparent screen 4 and has an arcuate portion back of the opening 3 and visible therethrough, the arcuate portion preferably being concentric with, or having the same center of radius as, the semi-circular opening 3. The radius of the arc of the fixed dial plate 10 is less than the radius of the arc of the semi-circular shaped opening 3, so that a portion of the dial 8, and on which the indicia appears, shows between the peripheral arcuate edge of the dial 10 and opening 3. Indicia is also provided on the fixed dial 10, and like the indicia on dial 8, it may consist of a number of spaced and radially extending lines or marks, together with numerals representing the hours of the day.

The radially extending lines or marks on dial 10 preferably run out to its arcuate edge. By rotating dial 8, any radial line thereon may be aligned with any radial line on the dial 10. Disposed within the casing 1 and located between the dials 8 and 10 there is a pointer member or hand 11 which is keyed to rotate with the shaft 7 and therefore may be rotated by means of the knob 9.

Journaled in the casing 1 there is another shaft 12 which extends transverse to the closure member 2 and extends through an opening therein and projects externally of the casing. The shaft 12 preferably projects externally of the casing at a point below the center of the circular closure member, as seen on the drawing, and in the same vertical plane therewith. On the outer end of the shaft 12 there is preferably provided a knob 13 for manually rotating the shaft. The shaft 12 extends rearwardly into the casing and has operative connection therein with the clock mechanism which includes a main spring 12a which may be wound by rotating the knob. The main spring 12a is wound around the rotatable shaft 12 and has its inner end secured to the shaft and its outer end secured to a fixed post 13a. The rotatable dial 8 is also rotatable by means of the knob 13 through a chain of gears comprising a gear 14 fixed or keyed on shaft 12, an intermediate gear 15 in mesh therewith and a gear 16 mounted for rotation on the fixed shaft 6. The gear 16 is disposed behind the dial plate 8 and disposed behind the gear 16 and mounted for rotation on shaft 6 there is a trip means or cam 18. Spacer members 19 are preferably provided between the dial 8 and gear 16, and between gear 16 and the cam 18. The rotatable dial 8, gear 16 and cam 18 are preferably fixedly connected so that the dial and cam are rotatable upon rotation of gear 16, and to this end they may be welded to the spacer members 19, or otherwise suitably secured together.

The motor or clock mechanism, through rotation of the cam 18, controls the operation of a switch means which may be of any suitable type and may be enclosed within the casing 1. The switch means, which is shown in Fig. 3, includes, in this instance, a fixed arm 22 which is mounted on the supporting plate 5 and which is secured to a laterally extending flange portion 23 thereof, there being insulating material provided between the metallic arm 22 and the metallic supporting plate 5, as at 24. The fixed arm 22 extends partway across the casing, and above the cam 18 and on the unsupported end of the arm, on the upper side thereof, is carried a contact member 25.

A movable contact arm 27 is pivoted at one end to the supporting plate 5, as at 29, and adjacent the fixed end of arm 22. The movable contact arm 27 extends partway across the casing 1, and preferably its free end extends beyond the unsupported end of arm 22, and on the free end of the pivotal arm 27 there is mounted an extension arm 31 which extends over the unsupported end of the arm 22 and carries a contact member 32 for engaging with contact member 25. Lead wires 33 and 34 are connected, such as by solder, to the arms 22 and 31, respectively, and may lead to terminals 35 and 36, respectively. The movable contact arm 27 has a bearing member 38 intermediate its ends which may be a lug formed out of the arm and which is arranged for bearing on the cam 18 in the manner of a cam follower. In the position shown in Fig. 3, the lug 38 is resting on a relatively high point of the cam 18 so that the arm 27 is raised and the contacts are out of engagement, but upon further rotation of the cam counterclockwise it will be seen that the arm 27 will fall down to the low point of the cam, and when this occurs the contacts 25 and 32 will be in engagement. A spring 30, which may be of any suitable type, is preferably provided for urging the pivotal arm 27 toward, and maintain it in engagement with, the cam 18.

While a control device of the character described is adaptable for use with any apparatus or system for automatically starting the same at a predetermined time, it is particularly suitable for use with a heating plant for starting the supplying of heat, or increasing supplying of heat, at a given time. One of the advantages of the present time controlled device is that it is easy to set and does not require any mental computation to do so. On the fixed dial 10 each of the lines represent a time at which the device may be set to operate, and in the present instance the range of selection is shown between 4 o'clock and 8 o'clock since it is usually between these hours in the morning that it is desired that the heating means be automatically started, or be operated to give more heat if the heating means is a coal stoker. For example, to set the device to close the circuit at say six o'clock in the morning, the pointer 11 is first rotated, if necessary, until it is in alignment with the line on the fixed dial 10 marked 6. If at the time of setting the device it is say eight o'clock in the evening, then the dial 8 is rotated in a clockwise direction by means of the knob 13 until the line marked 8 on the rotatable dial is in alignment with the pointer 11 and therefore in alignment with the line marked 6 on the fixed dial 10. In setting the device, as described above, it will be seen that the dial 8 and the cam 18 have been rotated through an angle corresponding to an operating time of ten hours which is, of course, the difference between the time of setting the device, or eight o'clock in the evening, and the time at which the circuit is to be closed, or six o'clock in the morning. It will also be seen that my device is easy to set to close a circuit at a predetermined time and without the necessity of calculating the difference between the time of setting the device and the time at which it is to close the circuit. After the device has operated, the spring 12a of course will be partially or totally unwound, but upon manually rotating the dial 8 to reset the device the spring 12a will at the same time be rewound and sufficient force stored in the spring to rotate the cam 18 to the position where the switch will be released for movement to closed position. Also, upon rotation of the dial 8, the clock mechanism is started and since the structure for accomplishing this is well known in the art to which this invention pertains, a disclosure and description of this structure is deemed unnecessary. This well known structure usually includes a brake (not shown) that stops the clock mechanism when the switch is closed, and which brake is released and the clock mechanism started when the cam is rotated by the knob 13 in setting the device. The clock mechanism, upon being started, begins to rotate the cam 18 and dial 8 through the gear train, and when the cam has been rotated through an angle corresponding to the difference between the time of setting the device and the time at which it is to close the circuit, the switch will be closed and the numeral 6 on the rotatable dial 8 will be in alignment with the numeral 6 on the fixed dial 10, as shown in Fig. 1. A brake means (not shown) is carried by the movable arm 27 of the switch mechanism for stopping the clock mechanism when the switch is closed, such brake means being well known in time control devices of the present type.

What I claim and desire to secure by Letters Patent of the United States is:

1. In a device of the character described, a rotatable shaft, a supporting means for said shaft, a switch means for controlling an electric circuit, trip means for said switch means, said trip means being carried by and rotatable with said shaft, manually operable means for rotating said shaft for positioning said trip means a predetermined distance from said switch means for operating said switch means at a desired time, a dial having markings thereon designating different times for selection of operation of said switch means by said trip means, a second dial, said second-named dial being carried by and rotatable with said shaft and having markings thereon registerable with the markings on said first-named dial, the markings on said second-named dial designating different settings of said trip means in accordance with the time of setting whereby said trip means can be positioned to actuate said switch means at a predetermined time by aligning the marking representing the time of setting on said rotatable dial with the marking representing the desired time of operation on said first-named dial.

2. In a device of the character described, a control means, means operable in fixed time relation and operable to actuate said control means, a fixed dial having indicia indicating different times selectable for operation of said control means, a rotatable dial disposed in overlapping relation with said fixed dial and having indicia cooperable with the indicia on said fixed dial, said rotatable dial being rotatable by said second-named means, and manually operable means for aligning indicia of said rotatable dial with indicia of said fixed dial for determining the time of operation of said control means.

3. The combination with a clock mechanism and a control means operable thereby of a pair of dials cooperable for determining the time of operation of the control means, one of said dials being fixed relative to the other and having indicia designating times selectable for operation of the control means, the other of said dials being rotatable by the clock mechanism and having indicia cooperable with the indicia of said one dial, said other dial being manually rotatable to align indicia thereof with indicia of the fixed dial to determine the time of operation of the control means.

4. The combination with a clock mechanism and a control means operable thereby of a pair of dials cooperable for determining the time of operation of the control means, said dials being arranged in overlapping relation with one of said dials being fixed relative to the other of said dials, said one dial having indicia designating times selectable for operation of the control means, said other dial being rotatable by the clock mechanism and having indicia cooperable with the indicia of said one dial, said other dial being manually rotatable for aligning indicia thereof with indicia of said one dial to determine the time of operation of the control means, and movable pointer means for alignment with indicia on said dials.

5. The combination with a clock mechanism and a control means operable thereby of a pair of dials cooperable to determine the time of operation of the control means, said dials being disposed in overlying spaced relation with a border portion of one of said dials extending beyond the periphery of the other of said dials, said one dial being fixed relative to the other of said dials and having indicia on said border portion with the indicia designating times selectable for operation of the control means, said other dial being rotatable by the clock mechanism and having indicia registerable with the indicia on said one dial, said other dial being manually rotatable to position indicia thereof in registration with indicia of said one dial for determining the time of operation of the control means.

6. The combination with a clock mechanism and a control means actuated thereby of a fixed indicating means, a movable indicating means having indicia cooperable with said first-named indicating means, said indicia designating times when the mechanism is set, and manually operable means for moving said movable indicating means to a position with respect to said first-named indicating means to determine the time of operation of the control means.

7. The combination with a spring operated clock mechanism and a control means actuated thereby of a fixed dial having indicia representing different times at which the clock may actuate the control means, a rotatable dial having indicia cooperable with the indicia of said fixed dial, the indicia of said second-named dial representing different times at which the device may be set, and manually operable means for positioning indicia of said movable dial with respect to indicia of said fixed dial and for winding the spring of the clock mechanism.

EARNEST J. DILLMAN.